Figure 1:
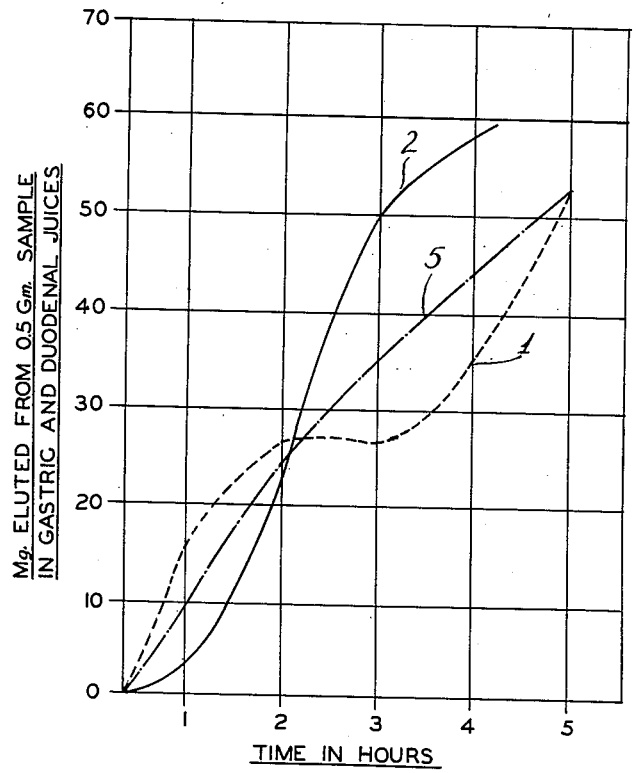

Dec. 12, 1961  D. A. SCHLICHTING  3,012,937
IRON RESIN SALT AND METHOD OF MAKING
Filed Aug. 11, 1958

INVENTOR
DAVID A. SCHLICHTING
BY Howson & Howson
ATTYS.

United States Patent Office 3,012,937
Patented Dec. 12, 1961

3,012,937
IRON RESIN SALT AND METHOD OF MAKING
David A. Schlichting, Oreland, Montgomery County, Pa., assignor to McNeil Laboratories, Incorporated, Philadelphia, Pa., a corporation of Pennsylvania
Filed Aug. 11, 1958, Ser. No. 754,267
2 Claims. (Cl. 167—55)

The present invention relates to novel iron salts; and, more particularly, the invention relates to novel ferrous iron resin salts possessing advantageous pharmaceutical properties and to the preparation of such salts.

About 10 to 20% of the iron ingested in the diet is absorbed. Much of this iron exists as ferric hydroxide and as loosely-bound metal chelates of ferric iron. Digestion includes ionization followed by reduction to the absorbable ferrous ions. Absorption is regulated by the need of the body, and probably occurs in small, relatively constant amounts. The iron in the body is conserved until needed; however, the average unsupplemented diet contains barely enough iron to meet the body requirements.

In the usual therapeutic does, most forms of iron have an astringent action on the gastric and intestinal mucosa. Iron is an irritant and can cause nausea, constipation, and even diarrhea. These are the common side reactions to oral iron therapy, and occur more often with ferric iron than with ferrous iron and more often with the more soluble ferrous forms than with the less soluble ferrous compounds. Iron is usually given with meals in order to lessen irritation, in spite of the fact that there are many interfering substances in food which have resulted in suggestions that iron might be better utilized when available for absorption between meals.

It is the principal object of the present invention to provide novel ferrous iron salts for use in oral iron therapy.

Another object of the present invention is to provide novel ferrous iron salts capable of releasing to the gastrointestinal tract a continuous, low level of ferrous ions over a prolonged period of time.

Still another object of the present invention is to provide novel ferrous iron salts which serve as a non-irritating source of ferrous ions in oral iron therapy.

A specific object of the present invention is to provide a novel combination of ferrous iron salts which produces the ideal straight line time-release relationship in the gastro-intestinal tract in oral iron therapy.

Other objects, including the provision of a method for preparing the novel salts of the present invention, will become apparent from a consideration of the following specification and claims.

The novel compounds of the present invention are salts of ferrous iron and a cation exchange resin selected from the group consisting of (1) nuclear sulfonic acid cation exchange resinous copolymers of styrene and divinylbenzene in which polystyrene is cross-linked with from about 5% to about 15%, by weight, of divinylbenzene based on the weight of the styrene and which contain between one and two sulfonic acid groups per benzene ring, (2) cation exchange resinous copolymers of acrylic acid and divinylbenzene in which polyacrylic acid is cross-linked with from about 3% to about 10%, by weight, of divinylbenzene based on the weight of the acrylic acid, (3) cation exchange resinous methylol sulfonic acid phenolformaldehyde condensation products in which at least 50% of the benzene nuclei contain a sulfomethyl group; (4) nuclear sulfonic acid cation exchange resinous copolymers of acrylic acid and divinylbenzene in which polyacrylic acid is cross-linked with from about 4% to about 14%, by weight, of divinylbenzene based on the weight of the acrylic acid and in which the ratio of carboxylic acid groups to sulfonic acid groups is about 4–5 to 1; and (5) a mixture of (1) and (2) in a weight ratio of between about 3 to 1 and about 1 to 3; said salt containing between about 5% and about 45%, by weight, of iron and being suitable for oral ingestion.

Figure 2:
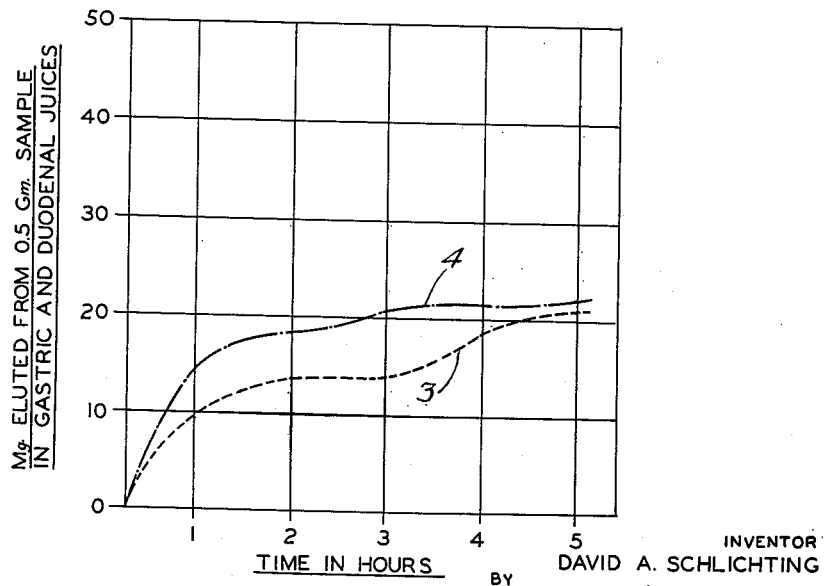

FIGURES 1 and 2 contain a series of curves in which amount of ferrous iron released in gastric and duodenal fluids is plotted against time and illustrate the relative iron release rates, in gastric and duodenal fluids, of typical salts of the present invention.

It has been found that ferrous salts of certain cation exchange resins can be prepared which produce prolonged and relatively gradual release of the ferrous iron not only in the gastric fluids but also in the intestinal fluids of the gastro-intestinal tract. Instead of becoming available to the gastro-intestinal tract substantially immediately upon oral ingestion, as is the case with the usual forms of iron medication, the salts of the present invention dissociate slowly over a period of hours, gradually releasing ferrous ions at a low concentration level. Hence, the salts of the present invention serve as a non-irritating source of ferrous iron from which the ferrous iron may be absorbed by the body more efficiently and more effectively than other conventional forms of iron medication. The salts of the present invention closely approximate non-irritating food iron. The controlled release of the ferrous iron over an extended period of time allows a more convenient dosage schedule. Since the amount of ferrous ions released at any one time is at a very low concentration, the salts can be administered so as to be effective between meals without irritation when the utilization of the iron is more efficient and effective. The more convenient dosage schedule makes it possible to give one or two doses a day of the present salts to accomplish what is presently being accomplished with three or four doses a day with conventional forms of oral iron medication. There have been significant numbers of accidental, fatal poisonings in children taking ferrous sulfate or other iron salts. The salts of the present invention, because of the slow release of the iron in the gastrointestinal tract, minimize or eliminate this danger.

Referring further to the resins employed in accordance with the present invention, they are all cation exchange resins have a pKa of no greater than 5.2. Cation exchange resins having a pKa greater than 5.2 have been found to be ineffective. The cation exchange resins which are suitable for use in accordance with the present invention comprise sulfonic acid and/or acrylic acid-containing cation exchange resinous copolymers or condensation products. Resin (1) referred to above is a copolymer of styrene and divinylbenzene in which polystyrene is cross-linked with from about 5 to about 15%, by weight, of divinylbenzene based on the weight of the styrene and in which substantially each of the benzene rings of the resin contains from one to two sulfonic acid groups attached thereto so that on the average there are between one and two sulfonic groups present per benzene ring. The resin is referred to as a "nuclear" sulfonic acid since the sulfonic acid groups are attached to the benzene nuclei of the styrene and divinylbenzene components. In the commercial grade there are between about 4.7 and about 5 milliquivalents of sulfonic acid groups per dry gram of resin. A resin of this type may be prepared according to U.S. Patent 2,366,007. Resin (2) is a cation exchange resinous copolymer of acrylic acid and divinylbenzene in which polyacrylic acid is cross-linked with from about 3 to about 10%, by weight, of divinylbenzene based on the weight of the acrylic acid. A resin of this type may be prepared according to U.S. Patent 2,340,111. Resin (3) is a cation exchange methylol sulfonic acid resinous phenol-formaldehyde condensation product. In this resin, sulfo methyl groups (—CH$_2$SO$_3$H) are attached to the benzene nuclei, and at least 50%, preferably substantially all, of the benzene nuclei will contain a sulfo methyl group attached thereto. A resin of this type may be prepared according to U.S. Patent 2,191,853. Resin (4) is a mixed acrylic acid-nuclear sulfonic acid resin being a nuclear sulfonic acid cation exchange resinous copolymer of acrylic acid and divinylbenzene in which polyacrylic acid is cross-linked with from about 4% to about 14%, by weight, of divinylbenzene based on the weight of the acrylic acid. Sulfonic acid groups are attached to the benzene nucleus of the divinylbenzene in an amount such that the ratio of the number of carboxylic acid groups to the number of sulfonic acid groups is between about 4 and about 5 of the former to 1 of the latter. The salt product represented by resin (5) is a physical mixture of the ferrous iron salts of resins (1) and (2), in which the preferred weight ratio of iron salt of resin (1) to iron salt of resin (2) is between about 3 and 1 of the former to between about 1 and 3 of the latter.

The resin as employed in preparing the iron salts may be in acid or salt, e.g. sodium, form, preferably the latter.

The resins employed in preparing the salts of the present invention advantageously have a particle size such that substantially all passes through a 16 mesh screen and is retained on a 200 mesh screen, preferably on a 50 mesh screen, since this is the generally desired size of the final product. However, the resin employed in preparing the salt may be somewhat more coarse in which event it may be necessary to reduce the salt product to the desired particle size.

In preparing the salts of the present invention, the cation exchange resin, in finely-divided form, is mixed with a solution of a ferrous iron salt. Preferably a water-soluble salt of the ferrous iron, such as the chloride, sulfate, acetate, nitrate, citrate, lactate, malate, and the like, is employed in aqueous solution.

The reaction takes place readily at room temperature and involves simply mixing the finely-divided resin with the ferrous iron solution. This can be accomplished either in a batch-wise manner in which the resin and ferrous iron solution are agitated together, or by a percolation procedure in which the solution is passed through a stationary bed or column of the resin. The resins are generally relatively efficient in withdrawing the ferrous iron from the solution so that the amount of iron in the solution may be just that corresponding to the amount of ferrous iron desired in the resulting resin salt. However, to facilitate the reaction it is preferred to employ excess ferrous iron over that theoretically required for a given ferrous iron content in the resulting salt, and such excess may correspond to as much as three times the theoretical amount required. The concentration of ferrous iron salt in the treating solution will generally be at least 1%, and may go up to the solubility limit of the particular salt selected. A concentration of ferrous iron salt between about 2 and about 5% has been found to be adequate. No difficulty will be encountered in determining when the reaction is complete. In a batch procedure, the resin will react with no more of the iron salt in the solution after an equilibrium has been reached and the residual iron concentration, if any, reaches a constant level; and, in a percolating procedure, reaction is complete when the iron concentration in the effluent becomes the same as that of the influent. The product will have a particle size corresponding to that of the resin employed.

The concentration of ferrous iron in the resin salts of the present invention may, as stated, range from about 5% to about 45%, by weight, the exact maximum concentration depending in part upon the particular resin selected. Thus the iron salt of resin (1) may contain up to about 15% of iron; the iron salt of resin (2) may contain up to about 24% of iron; the iron salt of resin (3) may contain up to about 22% of iron and the iron salt of resin (4) may contain up to about 45% of iron. In the mixture of iron salts of resins (1) and (2) the optimum iron concentration is between about 10 and about 20%.

It has been found possible to prepare iron resin salts in which the actual iron content will assay above the level theoretically possible for salt formation alone. It is believed that some iron is physically adsorbed by the resin and that some iron may be present in the resin in a form more complex than simple resin salt form. The figures set forth above include iron present in forms in addition to simple resin salt form it being understood that the major portion of the iron present is in the form of a simple iron salt with the resin. In addition it has been found that in some instances a small portion of the total iron content will be present in the product in ferric form. The figures set forth above include any small amount of ferric iron that may be present.

A consideration of FIGURES 1 and 2 shows that the iron resin salts of the present invention are not equivalent insofar as results are concerned. Of the iron resin salts, those of resins (1) and (2), curves 1 and 2, respectively, release significantly more iron over a given period of time than do the iron salts of resins (3) and (4), curves 3 and 4, respectively. Moreover, it has been found that a combination of the iron salts of resin (1) and of resin (2) produces a substantially uniform release rate (curve 5). This combined iron resin salt product, therefore, represents a particularly valuable, and the preferred, embodiment of the present invention.

The salts of the present invention must be suitable for oral ingestion so that during preparation care is taken to remove (if present) and to prevent contamination with metals and other elements or groups not pharmacologically suitable for ingestion during oral iron therapy.

The product may be made up into a pharmaceutical dosage form, such as tablets, pills, capsules, granules, cachets, powders and suspensions upon combination with an appropriate pharmaceutical carrier. The carrier may take a wide variety of forms depending upon the form of the preparation desired for administration. The preferred form of administration is oral, and in preparing the compositions in oral dosage form any of the usual pharmaceutical carrier media adapted for human oral ingestion may be employed, such as gelatin in the case of capsules; combinations of sterile water, glycols, suspending agents, oils, alcohols, and the like in the case of suspensions; combinations of starches, sugars, kaolin, salts, lubricants, binders, and the like in the case of powders and tablets. Tablets represent the most advantageous oral dosage form. The complete carrier, of course, will be pharmaceutically acceptable and should not impart toxicity or other undesirable side effects. Such pharmaceutical preparations will generally contain at least about 5% of the iron salt and may contain up to 80%–90% of the salt.

The product of the present invention and its preparation will be more readily understood from a consideration of the following specific examples which are given for the purpose of illustration only and are not intended to limit the scope of the invention in any way.

*Example I*

A nuclear sulfonic acid cation exchange copolymer of styrene and divinylbenzene in which polystyrene is cross-linked with 8–10% of divinylbenzene (Amberlite IR–120 made according to Example 1 of U.S. Patent 2,366,007) is converted to sodium salt form by treatment with aqueous sodium hydroxide solution. The resin has a particle size such that substantially all thereof passes through a 16 mesh screen and is retained on a 50 mesh screen. 229.3 grams of the wet resin (equivalent to 129 grams of dry resin) are placed in a column and washed with 500–750 ml. of distilled water.

A solution prepared by dissolving 375 grams of FeSO₄·7H₂O in 7500 ml. of distilled water and filtering, is added to the column and passed down through the resin at a rate of 27 ml. per minute. This is continued until the concentration of iron in the effluent is the same as that in the influent which required about 150 minutes and 4300 ml. of solution. The resulting resin salt is then washed with 3–4 volumes of distilled water, permitted to drain and then dried overnight at 60° C. There are obtained 155.9 grams of resin salt (containing 5–10% of moisture) assaying 10.8% of ferrous iron, by weight.

The product was tested for rate of iron release in fasting gastric juice and in fasting duodenal juice. The tests were conducted using a standard U.S.P. tablet disintegrating apparatus, modified to provide individual fluid receptacles for each of the six tablet-holding tubes instead of a single common test fluid receptacle and to provide a fine screen capable of holding substantially all of the finely-divided resin salt at the bottom of each tablet holding tube in place of the common coarse screen. The test for the first three hours was in fasting gastric juice (pH 1–2), and for the last two hours in a mixture of fasting gastric juice and fasting duodenal juice in which the concentration of duodenal juice is increased gradually over the two hour period. During the first hour in each test 0.5 gram of the iron resin salt is agitated in 50 ml. of gastric juice at 37±2° C. A 2 ml. aliquot of the gastric juice is removed from each receptacle at the end of each hourly period for the first three hours and assayed. After the third hour, 10 ml. increments of fasting duodenal juice are added to each receptacle every 15 minutes until 50 ml. are added at which time the pH has risen to 5–6. After the fourth and fifth hours, 2 ml. aliquots of liquid are removed and assayed. The results are as follows:

Total Fe⁺⁺ released from
0.5 g. sample:                        At end of—
   15 mg _____ 1 hour.
   26 mg _____ 2 hours.
   26 mg _____ 3 hours.
   36 mg _____ 4 hours.
   51 mg _____ 5 hours.

The foregoing data are embodied in curve 1 of FIGURE 1.

*Example II*

Two hundred and fifty-two grams of wet polyacrylic acid cross-linked with 8–10% of divinylbenzene and having a particle size through 16 mesh and on 50 mesh (equivalent to 100 grams of dry resin, Amberlite XE 89, prepared in accordance with U.S. Patent 2,340,111) are mixed with a solution prepared by dissolving 60 grams of sodium hydroxide in 1500 ml. of distilled water. After stirring this mixture for thirty minutes, the aqueous medium is removed, and the resin is washed with distilled water until a pH of 7 is achieved.

Two hundred grams of FeCl₂·4H₂O are dissolved in 1550 ml. distilled water. The resulting solution is mixed with the above-treated resin and the mixture is stirred for 90 minutes. After the treated resin has settled, the aqueous medium is decanted and the resin is washed with distilled water and dried to a constant weight.

The resulting salt contains 17.3% ferrous iron and 2.7% of ferric iron.

The salt was tested as in Example I except that the test lasted for four hours (the first three in fastening gastric juice). The results are as follows.

Total Fe⁺⁺ released from
0.5 g. sample:                        At end of—
   3 mg _____ 1 hour.
   23 mg _____ 2 hours.
   50 mg _____ 3 hours.
   58 mg _____ 4 hours.

The foregoing data are embodied in curve 2 of FIGURE 1.

*Example III*

Twenty grams of a dry methylol sulfonic acid phenol-formaldehyde resin (in which substantially all of the benzene nuclei contain a sulfo methyl group), acid form, particle size through 16 on 50 mesh (Duolite C–3H) are soaked for 15–20 minutes in 50 ml. of distilled water, after which the water is decanted. The resin is then mixed with 150 ml. of a 5% NaOH solution and stirred for ½ hour at room temperature. The solution is decanted following which a further 150 ml. of a 5% NaOH solution is mixed with the resin and the mixture stirred for ½ hour. After decantation of the solution, the resin is washed with 850 ml. of distilled water until the pH of the wash water is reduced to 10–11.

The resin is then added slowly to 500 ml. of a 5% FeSO₄·7H₂O solution in distilled water with stirring for ½ hour. The solution is decanted and the procedure repeated with a further 500 ml. portion of a 5% FeSO₄·7H₂O solution. After decantation of the solution the product is washed with 1500 ml. of distilled water. The resulting product is dried on a Büchner funnel, air dried and then dried to constant weight over calcium chloride. There results 24.4 grams of iron resin salt assaying 15.2% of ferrous iron and 6.3% of ferric iron.

The salt was tested as in Example I using, however, as the gastric fluid simulated gastric fluid U.S.P. and as the duodenal fluid simulated intestinal fluid U.S.P. without pancreatin. The results were as follows:

Total Fe⁺⁺ released from
0.5 g. sample:                        At end of—
   10 mg _____ 1 hour.
   13 mg _____ 2 hours.
   13 mg _____ 3 hours.
   19 mg _____ 4 hours.
   21 mg _____ 5 hours.

The foregoing data are embodied in curve 3 of FIGURE 2.

*Example IV*

Forty grams of wet nuclear sulfonic acid cation exchange polyacrylic acid cross-linked with 11.5% of divinylbenzene (equivalent to 18.8 grams of dry resin) having a ratio of carboxylic acid groups to sulfonic acid groups of 4.7:1, a particle size of through 16 on 50 mesh and in acid form are placed in a vertical glass ion exchange column. Six hundred ml. of a 5% NaOH solution are passed through the column at the rate of 5 ml. per minute to convert the resin to sodium form. The resin is removed from the column and washed with four 250 ml. quantities of distilled water.

The washed resin is added to 500 ml. of a 5% solution of FeSO₄·7H₂O in distilled water and the mixture is stirred slowly for one hour. The resin is then returned to the column and 700 ml. of a 5% FeSO₄·7H₂O solution in distilled water are passed through the column.

The resulting product is removed from the column and washed with four 250 ml. quantities of distilled water, and then dried over calcium chloride at 40° C. for three days. The resulting salt assays 15.7% of ferrous iron and 4.6% of ferric iron.

The resin salt was tested as in Example I with the following results.

Total mg. of Fe⁺⁺ released
from 0.5 g. sample:                   At end of—
   14 mg _____ 1 hour.
   18 mg _____ 2 hours.
   21 mg _____ 3 hours.
   21 mg _____ 4 hours.
   22 mg _____ 5 hours.

The foregoing data are embodied in curve 4 of FIGURE 2.

Example V

Equal parts by weight of the resin salts prepared in accordance with Examples I and II are mixed and tested as in Example I with the following results.

Total mg. of Fe$^{++}$ released
from 0.5 g. sample:                   At end of—
    9 mg_____ 1 hour.
    23 mg_____ 2 hours.
    35 mg_____ 3 hours.
    43 mg_____ 4 hours.
    48 mg_____ 5 hours.

The foregoing data are embodied in curve 5 of FIGURE 1.

Example VI

One thousand tablets each containing 0.25 gram of iron resin salt may be prepared from the following:

|  | Grams |
|---|---|
| Iron resin salt | 250 |
| Aluminum hydroxide dried gel | 340 |
| Powdered sugar | 35 |
| Starch | 70 |
| Gelatin | 100 |
| Calcium stearate | 15 |

The mixture is granulated, dried, ground, lubricated and then compressed into tablets each weighing 0.81 gram.

Example VII

Five hundred ml. of suspension containing 0.5 gram of iron resin salt per 5 ml. may be prepared from the following:

|  | Grams |
|---|---|
| Iron resin salt | 500 |
| Powdered sugar | 1000 |
| Flavor and color | 50 |
| Aluminum monostearate | 50 |

Corn oil to make 5000 ml.

Modification is possible in the details of preparing the iron resin salt as well as in the product itself and in pharmaceutical preparations made therefrom without departing from the scope of the invention.

I claim:
1. A mixture of a ferrous iron salt of a nuclear sulfonic cation exchange resinous copolymer of styrene and divinylbenzene in which polystyrene is cross-linked with from about 5% to about 15%, by weight, of divinylbenzene based on the weight of the styrene and which contains between one and two sulfonic acid groups per benzene ring, said salt containing from about 5 to about 15% of iron; and of a ferrous iron salt of a cation exchange resinous copolymer of acrylic acid and divinylbenzene in which polyacrylic acid is cross-linked with from about 3% to about 10%, by weight, of divinylbenzene based on the weight of the acrylic acid, said second mentioned salt containing from about 5 to about 24% of iron; said salts being present in a weight ratio of between about 3 to 1 and about 1 to 3 and being suitable for oral ingestion.

2. A method of preparing a ferrous iron salt product capable of releasing ferrous ions in the gastro-intestinal tract at a substantially uniform rate which comprises mixing a nuclear sulfonic acid cation exchange resinous copolymer of styrene and divinylbenzene in which polystyrene is cross-linked with from about 5% to about 15%, by weight, of divinylbenzene based on the weight of the styrene and which contains between one and two sulfonic acid groups per benzene ring with a solution of a ferrous iron salt until the equivalent of from about 5 to about 15% of iron, based on the weight of the resin salt, has been combined with the resin, and recovering the resulting iron resin salt; mixing a cation exchange resinous copolymer of acrylic acid and divinylbenzene in which polyacrylic acid is cross-linked with from about 3% to about 10%, by weight, of divinylbenzene based on the weight of the acrylic acid with a solution of a ferrous iron salt until the equivalent of from about 5 to about 24% of iron, based on the weight of the resin salt, has been combined with the resin, and recovering said second-mentioned iron resin salt; and mixing the said two iron resin salts in a weight ratio of from about 3 to about 1 parts by weight of the former to from about 1 to about 3 parts, by weight, of the latter.

References Cited in the file of this patent

Amber: Hi-Lites, No. 53, September 1959.
Nachod: "Ion Exchange," Academic Press (1949), pp. 119, 120.
Nachod: "Ion Exchange Technology," Academic Press (1956), pp. 240, 265, 266.